(12) United States Patent
Vuskovic et al.

(10) Patent No.: US 11,615,124 B2
(45) Date of Patent: *Mar. 28, 2023

(54) SUBQUERY GENERATION FROM A QUERY

(71) Applicant: Google LLC, Mountain View, CA (US)

(72) Inventors: Vladimir Vuskovic, Zollikerberg (CH); Joseph Lange, Zurich (CH); Behshad Behzadi, Freienbach (CH); Marcin M. Nowak-Przygodzki, Bäch (CH)

(73) Assignee: Google LLC, Mountain View, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 17/116,296

(22) Filed: Dec. 9, 2020

(65) Prior Publication Data

US 2021/0089564 A1  Mar. 25, 2021

Related U.S. Application Data

(63) Continuation of application No. 16/135,205, filed on Sep. 19, 2018, now Pat. No. 10,885,077.

(60) Provisional application No. 62/564,800, filed on Sep. 28, 2017.

(51) Int. Cl.
*G06F 16/332* (2019.01)
*G06F 16/33* (2019.01)

(52) U.S. Cl.
CPC ...... *G06F 16/3325* (2019.01); *G06F 16/3329* (2019.01); *G06F 16/3338* (2019.01); *G06F 16/3344* (2019.01); *G06F 16/3349* (2019.01)

(58) Field of Classification Search
CPC ............. G06F 16/3325; G06F 16/3329; G06F 16/3344; G06F 16/3349

USPC ........................................................ 707/722
See application file for complete search history.

(56) References Cited

U.S. PATENT DOCUMENTS

| 6,189,013 | B1* | 2/2001 | Maslyn | G16B 50/10 |
| 9,037,580 | B2* | 5/2015 | Brown | G06F 16/3329 |
| | | | | 706/14 |
| 2010/0332235 | A1 | 12/2010 | David | |
| 2012/0078888 | A1* | 3/2012 | Brown | G06F 16/284 |
| | | | | 707/723 |

(Continued)

OTHER PUBLICATIONS

European Patent Office; Communication Pursuant to Article 94(3) EPC issued in Application No. 18793723.0; 11 pages; dated Mar. 5, 2021.

(Continued)

*Primary Examiner* — Dung K Chau
(74) *Attorney, Agent, or Firm* — Gray Ice Higdon

(57) ABSTRACT

Methods, systems, and apparatus, including computer programs encoded on a computer storage medium, for generating subqueries from a query. In one aspect, a method includes obtaining a query, generating a set of two subqueries from the query, where the set includes a first subquery and a second subquery, determining a quality score for the set of two subqueries, determining whether the quality score for the set of two subqueries satisfies a quality threshold, and in response to determining that the quality score for the set of two subqueries satisfies the quality threshold, providing a first response to the first subquery that is responsive to a first operation that receives the first subquery as input and providing a second response to the second subquery that is responsive to a second operation that receives the second subquery as input.

18 Claims, 4 Drawing Sheets

(56) References Cited

U.S. PATENT DOCUMENTS

| 2015/0039579 | A1* | 2/2015 | Clark ................... G06F 16/367 |
| | | | 707/706 |
| 2015/0348551 | A1 | 12/2015 | Gruber et al. |
| 2017/0139991 | A1* | 5/2017 | Teletia ................ G06F 16/9024 |

OTHER PUBLICATIONS

PCT Written Opinion issued in PCT/US2018/053454 dated Aug. 5, 2019. 9 pages.

Abujabal et al. "Automated Template Generation for Question Answering over Knowledge Graphs," International World Wide Web Conference Steering Commettee, Apr. 3, 2017. 10 pages.

Jones et al. "Generating query substitutions," Proceedings of the 15th International Conference on World Wide Web, May 23, 2006. 10 pages.

PCT International Search Report and Written Opinion issued in International Application No. PCT/US2018/053454 dated Nov. 26, 2018. 18 pages.

Sembrzuski et al., "Automatic Speech Recognition Adaptation to the IoT Domain Dialogue System," International Conference on Simulation, Modeling, and Programming for Autonomous Robots, Lecture notes in Computer Science, 2010 [retrieved on Jun. 14, 2017], 12 pages.

European Patent Office; Summons to Attend Oral Proceedings issued in Application No. 18793723.0, 13 pages, dated Sep. 29, 2022.

* cited by examiner

SUBQUERY GENERATION FROM A QUERY

BACKGROUND

Computing systems may handle various queries from users. For example, a query may be in the form of a sequence of words that make up a search query and a computing system may, in response to receiving the search query, provide search results responsive to the search query. For example, a search query may be "Isaac Asimov books." Other queries may be commands for a computing system to execute.

For example, a query may be a voice command of "Turn off lights in the living room" and the computing system may, in response to receiving an utterance of "Turn off lights the living room," turn off the lights in a living room and provide an acknowledgement of "Lights have been turned off in the living room." Still other queries may be questions for a computing system to provide an answer. For example, a query may be a question of "What temperature is it outside" and the computing system may, in response, provide an answer of "The current outdoor temperature in Mountain View, Calif. is 70° F."

SUMMARY

In general, one innovative aspect of the subject matter described in this specification is embodied in methods that include the actions of obtaining a query, generating a set of two subqueries from the query, where the set includes a first subquery and a second subquery, determining a quality score for the set of two subqueries, determining whether the quality score for the set of two subqueries satisfies a quality threshold, and in response to determining that the quality score for the set of two subqueries satisfies the quality threshold, providing a first response to the first subquery that is responsive to a first operation that receives the first subquery as input and providing a second response to the second subquery that is responsive to a second operation that receives the second subquery as input. An operation may include a web search, execution of a command, or some action.

Other implementations of these aspects include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. For instance, in certain aspects, determining a quality score for the set of two subqueries includes determining a frequency that the first subquery appears in a log of prior queries from multiple users and determining the quality score for the set of two subqueries based at least on the frequency that the first subquery appears in the log of prior queries from multiple users. In some aspects, determining a quality score for the set of two subqueries includes determining a number of search results that are responsive to the first subquery and determining the quality score for the set of two subqueries based at least on the number of search results that are responsive to the first subquery.

In some implementations, determining a quality score for the set of two subqueries includes determining whether the first subquery corresponds to a voice action operation and determining the quality score for the set of two subqueries based at least on a determination that the first subquery corresponds to a voice action operation. In certain aspects, determining a quality score for the set of two subqueries includes determining whether the first subquery corresponds to a question with a known answer and determining the quality score for the set of two subqueries based at least on that the first subquery corresponds to a question with a known answer. In some aspects, determining whether the quality score for the set of two subqueries satisfies a quality threshold includes determining whether the quality score for the set of two subqueries satisfies a predetermined threshold that reflects that a user is likely to be satisfied by respective operations being executed using each of the two subqueries.

In some implementations, the operations include generating a second set of two subqueries from the query, determining a second quality score for the second set of two subqueries, and determining that the first quality score reflects that respective operations being executed using the two subqueries of the first set of two subqueries is more likely to satisfy a user than respective operations being executed using the two subqueries of the second set of two subqueries. In certain aspects, generating a set of two subqueries from the query includes identifying a position of one or more particular characters in the query, generating the first query from a first portion of the query before the position of the one or more particular characters in the query, and generating the second query from a second portion of the query after the position of the one or more particular characters in the query. In some aspects, the one or more particular characters are the word "and."

In some implementations, generating a set of two subqueries from the query includes identifying a list of items in the query, generating the first query from the portion of the query up to and including a first item of the list, and generating the second query from the portion of the query before the first item of the list and including a second item of the list. In certain aspects, generating a set of two subqueries from the query includes determining that a phrase in the query can be used as a third subquery that results in the list of items and replacing the phrase in the query with the list of items.

In some aspects, providing a first response to the first subquery that is responsive to a first operation that receives the first subquery as input and providing a second response to the second subquery that is responsive to a second operation that receives the second subquery as input includes providing the first subquery as input to a search operation, obtaining the first response from the search operation in response to the first subquery, providing the second subquery as input to a voice action operation, obtaining the second response from the voice action operation in response to the second subquery, and providing the first response and the second response for output to a user. In some implementations, an output of the second operation is dependent on providing the first subquery as input to the first operation.

Particular embodiments of the subject matter described in this specification can be implemented so as to realize one or more of the following advantages. Allowing a system to generate multiple subqueries from a single query from a user may reduce the amount of time spend by the user to interact with the system and the number of interactions with the system needed. For example, the system may enable a user provide a single compound query that includes a first query and a second query instead of needing a user to provide the first query to the system and then wait for the system to provide a response to the first query before the user provides the second query to the system. Allowing the use of a single compound query instead of multiple separate queries may also reduce the number of transmissions needed between a device and server. For example, instead of a device needing to send two respective transmissions to a server for two queries the device may instead send a single transmission with the compound query.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
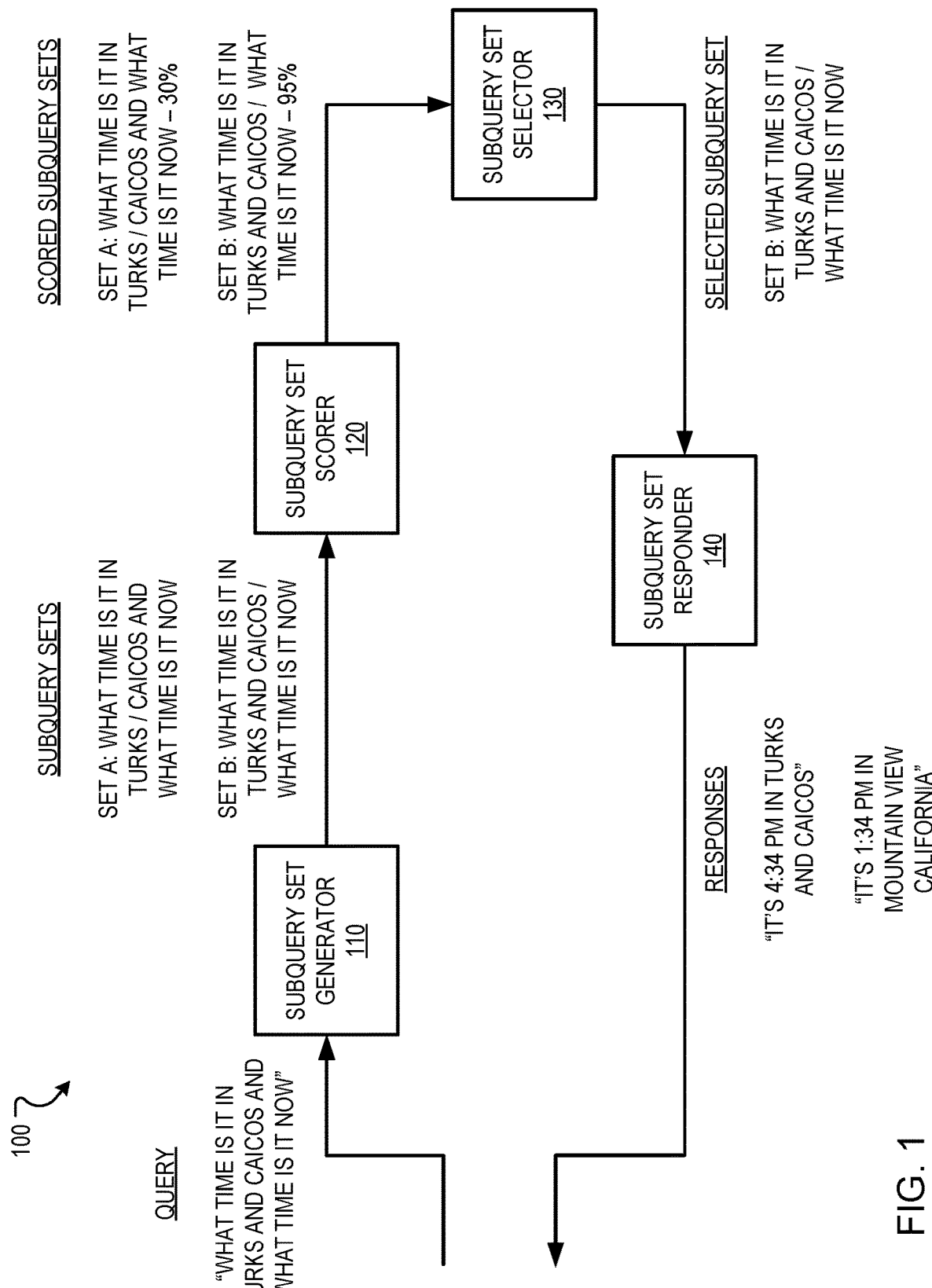
FIG. 1 illustrates a block diagram of an example system that generates subqueries from a query.

A user may desire that a system execute multiple queries. For example, a user may first say "OK Computer, turn on the lights," wait for a speech-enabled device to respond with "lights turned on," and then say "OK Computer, turn on some music." However, this process may be time consuming and require multiple interactions by the user as the user may need to wait for the first query to execute before providing the second query.

Described below are system and method for generating subqueries from a query. Instead of executing only a single query per interaction with a user, a system may generate multiple subqueries from a single query received from a user and then execute each of the subqueries without further interaction from the user. A query, as appears in this description, is not limited to a request for information such as a search operation and may not be a request at all. For example, in addition to a request for information, a query may be an instruction, a command, a declarative, etc. and may seek assistance, an action or inaction, a changing of settings, media content, etc.

A subquery may refer to a query that is generated from a portion of another query. For example, a system may receive an utterance of "turn on the lights and some music" and generate a first subquery of "turn on the lights" and a second subquery of "turn on some music."

In generating the multiple subqueries, the system may generate various different sets of subqueries that include combinations of terms from the query received from the user. For example, the system may generate sets of two subqueries where each set corresponds to the query being split on a difference "space" character in the query. In another example, the system may generate sets of two subqueries where each set corresponds to the query being split on different "and" that appear in a query. In yet another example, the system may generate a set of two subqueries based on determining that a query is listing multiple items and, in response, generate a subquery for each of the items.

The system may then determine whether each of the sets include subqueries that result in the execution of operations with which a user is likely to be satisfied. For example, the system may determine that the set of subqueries of "turn on the lights" and "turn on some music" includes subqueries that that result in voice action operations of "turn on lights" and "turn on music" to be executed. And since these may be valid voice action operations, the system may determine the subqueries are likely to satisfy a user. In response to determining that a set of subqueries result in the execution of operations with which a user is likely to be satisfied, the system may then execute each of the subqueries. For example, in response to determining that the set of subqueries of "turn on the lights" and "turn on some music" result in voice actions of "turn on lights" and "turn on music" to be executed, the system may then execute the voice actions of "turn on lights" and "turn on music."

These features and additional features are described in more detail below.

FIG. 1 illustrates a diagram of an example system 100 that generates subqueries from a query. The system 100 includes a subquery set generator 110, a subquery set scorer 120, a subquery set selector 130, and a subquery set responder 140.

The subquery set generator 110 receives a query and generates one or more sets of subqueries from the query. For example, the subquery set generator 110 may receive the query "What time is it in Turks and Caicos and what time is it now" and generate a first set of two subqueries of "What time is it in Turks" and "Caicos and what time is it now" and a second set of two subqueries of "What time is it in Turks and Caicos" and "what time is it now." The query may be a query that was typed by a user or a query that is transcribed by an automated speech recognizer from an audio recording of an utterance.

The subquery set generator 110 may generate sets of subqueries by identifying positions of particular characters in the query and generating a first query from a first portion of the query before the position of the one or more particular characters in the query and generating a second query from a second portion of the query after the position of the one or more particular characters in the query. For example, the subquery set generator 110 may identify that the particular characters of "and" occur in two different positions in the query "What time is it in Turks and Caicos and what time is it now" and, in response, generate a first set of subqueries where the query is split at the first position into "What time is it in Turks" and "Caicos and what time is it now" and a second set of subqueries where the query is split at the second position into "What time is it in Turks and Caicos" and "what time is it now."

In another example, the subquery set generator 110 may identify where all space characters occur in a query and generate different sets of subqueries where the query is split based on respective positions of spaces. In the example, the subquery set generator 110 may split the query "What time is it in Turks and Caicos and what time is it now" which has thirteen spaces into thirteen different sets of two subqueries where a first set includes the subqueries "What" and "time is it in Turks and Caicos and what time is it now," a second set includes the subqueries "What time" and "is it in Turks and Caicos and what time is it now," etc.

Figure 2:
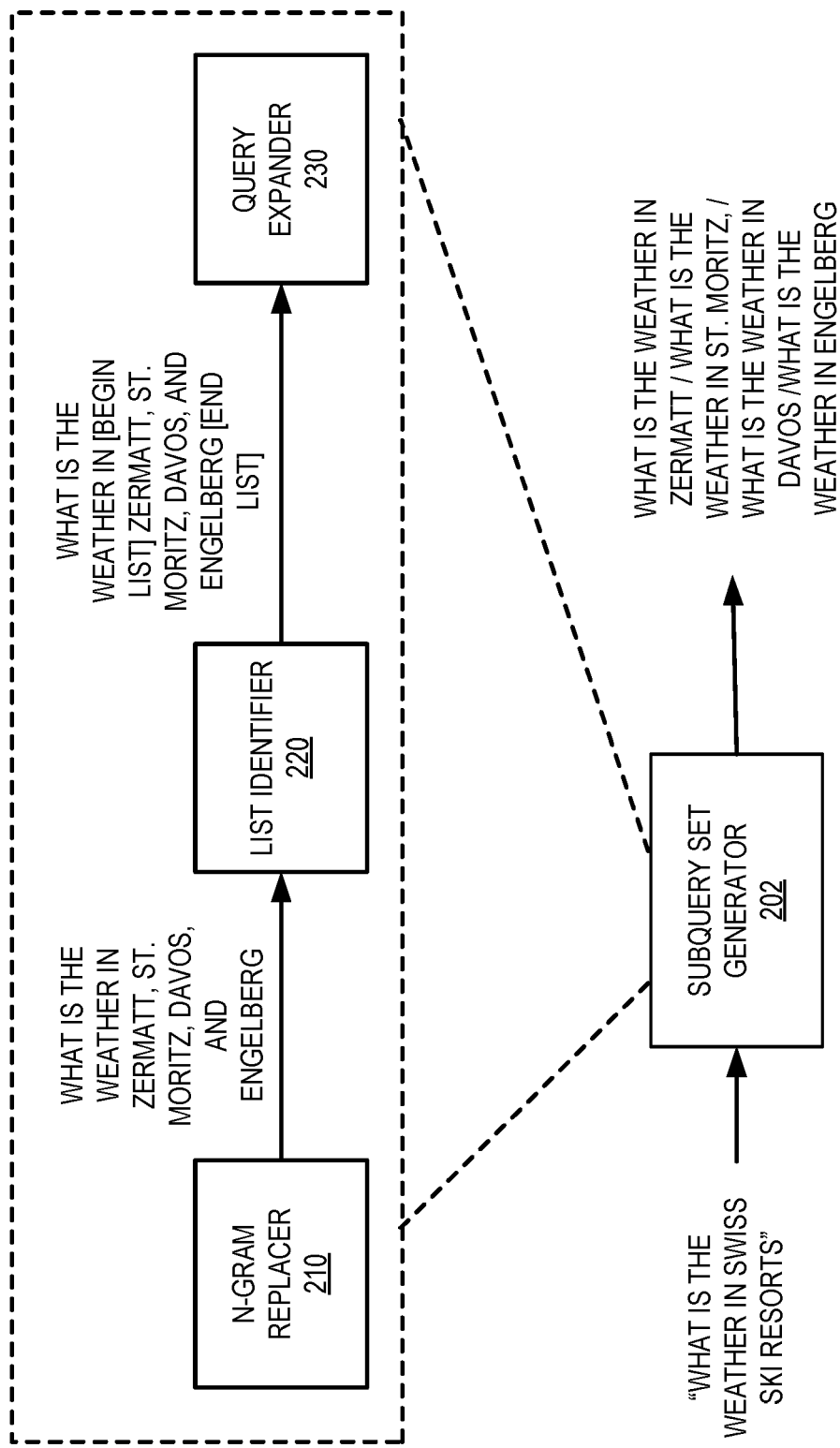
FIG. 2 is a block diagram of an example subquery set generator.

The subquery set generator 110 may additionally or alternatively use other approaches to generate sets of subqueries as described further in FIG. 2.

The subquery set scorer 120 may obtain sets of subqueries and determine quality scores for each of the sets of subqueries. For example, the subquery set scorer 120 may obtain a first set of subqueries of "What time is it in Turks" and "Caicos and what time is it now" and determine a quality score of 30%. In another example, the subquery set scorer 120 may obtain a second set of subqueries of "What time is it in Turks and Caicos" and "what time is it now" and determine a quality score of 95%.

A quality score for a set of subqueries may reflect a likelihood that a user will be satisfied by respective operations being executed using each of the two subqueries. For example, a quality score of 30% may reflect a 30% likelihood that a user will be satisfied by, or a 30% likelihood that the user will ultimately select, both a first operation being executed using the subquery "What time is it in Turks" as input and a second operation being executed using the subquery "Caicos and what time is it now" as input. In another example, a quality score of 95% may reflect a 95% likelihood that a user will be satisfied by, or a 95% likelihood that the user will ultimately select, both a first operation being executed using the subquery "What time is it in Turks and Caicos" as input and a second operation being executed using the subquery "What time is it now" as input. The quality score may be represented other than by a percentage. For example, a quality score may be presented by a score between zero and ten with ten being the highest, a score between zero and ten with ten being the lowest, a grade between "A" and "F," or some other representation.

The quality score may reflect a statistical compliance with similar query patterns selected by other users or in other search sessions, suggesting a reduced likelihood of re-searching with a modified query, reducing the bandwidth usage for such re-searching, reducing the memory and processor demands and display real estate required for providing search results for multiple different subqueries in one search session, and other system-specific improvements.

The subquery set scorer 120 may determine a quality score for a set of subqueries based at least on a frequency that a subquery in the set appears in a log of prior queries from multiple users. The subquery set scorer 120 may determine quality scores that reflect a greater likelihood for sets with subqueries that appear more frequently in a log of prior queries. For example, the subquery set scorer 120 may determine that a query "What time is it in Turks" appears semi-frequently in a log of prior queries but a query "Caicos and what time is it now" occurs very infrequently in a log of prior queries and, in response, determines a quality score of 30% for the set. In another example, the subquery set scorer 120 may determine that a query "What time is it in Turks and Caicos" appears frequently in a log of prior queries and a query "what time is it now" occurs very frequently in a log of prior queries and, in response, determines a quality score of 90% for the set. The log of prior queries from multiple users may be a log of queries previously received from all users of the system 100.

Additionally or alternatively, the subquery set scorer 120 may determine a quality score for a set of subqueries based at least on a number of search results that are responsive to a subquery of the set. The subquery set scorer 120 may determine quality scores that reflect a greater likelihood for sets with subqueries that have a greater number of search results responsive to the subqueries. For example, the subquery set scorer 120 may determine that the subquery "what are some nearby bed" has few responsive search results and the subquery "breakfasts and what are some nearby attractions" also has few responsive search results and, in response, determine a score of 35% for the set including those two subqueries. In another example, the subquery set scorer 120 may determine that the subquery "what are some nearby bed and breakfasts" has many responsive search results and the subquery "what are some nearby attractions" also has many responsive search results and, in response, determine a score of 90% for the set including those two subqueries.

Additionally or alternatively, the subquery set scorer 120 may determine a quality score for a set of subqueries based at least on whether a subquery of the set corresponds to a voice action operation. A voice action operation may be an operation that may be executed in response to an utterance. The subquery set scorer 120 may determine quality scores that reflect a greater likelihood for sets with subqueries that correspond to voice actions. For example, the subquery set scorer 120 may determine that the subquery "turn on the lights" and the subquery "turn on some music" both correspond to known voice actions and, in response, determine a score of 100% for the set including the two subqueries. In another example, the subquery set scorer 120 may determine that the subquery "turn on the lights and turn" and the subquery "on some music" do not correspond to known voice actions and, in response, determine a score of 0% for the set including the two subqueries.

Additionally or alternatively, the subquery set scorer 120 may determine a quality score for a set of subqueries based at least on whether a subquery of the set corresponds to a question with a known answer. A question with a known answer may be a question to which the system 100 is able to provide an answer that answers the question. For example, a question with a known answer may be "When did the United States adopt the Declaration of Independence" and the known answer may be "Jul. 4, 1776." In another example, a question with a known answer may be "What day is Thanksgiving Day this year" and the known answer may be Nov. 23, 2017. The system 100 may store pairs of questions and known answers so that for any question the system 100 can determine whether there is a known answer based on determining whether the question is stored in a pair with a known answer.

Additionally or alternatively, the subquery set scorer 120 may determine a quality score for a set of subqueries based one or more of a number of terms in a subquery that are not in the query or a number of terms that are not in any subquery in the set but are in the query. For example, subquery set scorer 120 may determine a quality score that reflects a greater likelihood that a user will be satisfied by respective operations being executed using each of the two subqueries for sets with subqueries that include fewer words that do not appear in the query. In another example, the subquery set scorer 120 may determine a quality score that reflects a greater likelihood that a user will be satisfied by respective operations being executed using each of the two subqueries for sets with subqueries that include more of the words that do appear in the query.

Additionally or alternatively, the subquery set scorer 120 may determine a quality score for a set of subqueries based at least on whether the subqueries match a phrase in a phrase model such as a phrase model associated with a search engine. For example, the subquery set scorer 120 may determine a quality score for a set of subqueries that is greater than a quality score for a second set of subqueries based on determining that the subqueries of the set of subqueries each include a phrase in a phrase model and only one of the subqueries of the second set of subqueries includes a phrase in the phrase model. Additionally or alternatively, the subquery set scorer 120 may determine a quality score for a set of subqueries based at least on whether the terms in the subqueries appear in search results that are responsive to searches run using the subqueries. For example, the subquery set scorer 120 may determine a quality score for a set of subqueries that is greater than a quality score for a second set of subqueries based on determining that all the terms of the subqueries of the set of subqueries appears at least once in the search results responsive to the subqueries and determining that all the terms of the subqueries of the second set of subqueries do not appear at least once in the search results responsive to the subqueries.

In some implementations, the subquery set scorer 120 may determine the importance of each word in a query or subquery and weight the addition or absence of the word in determining a quality score. For example, the subquery set scorer 120 may determine entities are important so determine that the omission of any term for an entity from the query in the subqueries greatly lowers a quality score and the omission of any term for any non-entity from the query in the subqueries slightly lowers a quality score.

The subquery set selector 130 obtains the sets of subqueries and selects one of the sets of subqueries based at least on the quality scores of the sets. For example, the subquery set selector 130 may obtain a first set of subqueries of "What time is it in Turks" and "Caicos and what time is it now" with a quality score of 30% and a second set of subqueries of "What time is it in Turks and Caicos" and "What time is it now" with a quality score of 95% and select the second set of subqueries based at least on that the quality score for the second set of subqueries is 95%, which is greater than the quality score of 30% for the first set.

The subquery set selector 130 may select the set of subqueries, with the quality score that reflects that greatest likelihood that a user will be satisfied by respective operations being executed using each of the two subqueries, from among the multiple sets of subqueries. For example, the subquery set selector may determine that a quality score of 95% of a second set of subqueries reflects a greater likelihood that a user will be satisfied by respective operations being executed using each of the two subqueries than a quality score of 30% of a first set of subqueries and, in response, select the second set of subqueries.

Additionally or alternatively, the subquery set selector 130 may select the set of subqueries based at least on determining that the quality score for the set of subqueries satisfies a quality threshold. For example, the subquery set selector 130 may select the set of subqueries with a quality score of 90% in response to determining that the quality score of 90% is greater than a quality threshold of 70%, 80%, 85%, etc., or some other quality threshold. A quality threshold may be a predetermined threshold that reflects that a user is likely to be satisfied by respective operations being executed using each of the two subqueries. In implementations, if the subquery set selector 130 determines that no set of subqueries has a quality score that satisfies the quality threshold, then the subquery set selector 130 may determine not to select any set of subqueries and may select the original query.

The subquery set responder 140 may obtain the set of queries that is selected and provide responses to the subqueries. For example, the subquery set responder 140 may obtain the selected set of subqueries of "What time is it in Turks and Caicos" and "what time is it now" and provide responses of "It's 4:34 PM in Turks and Caicos" and "It's 1:34 PM in Mountain View, Calif."

The subquery set responder 140 may provide responses to the subqueries by providing the subqueries as inputs into respective operations and providing output of the respective operations as the responses to the subqueries. For example, the subquery set responder 140 may provide the subquery "What time is it in Turks and Caicos" to an operation that provides answers which provides a response of "it's 4:34 in Turks and Caicos." In another example, the subquery set responder 140 may provide the subquery "Turn on the lights" to a voice action operation which provides a response of "Lights have been turned on" and turns on lights. In some implementations, the subquery set responder 140 may provide the responses in one or more of an audio or visual form. For example, the subquery set responder 140 may provide the responses as text to be displayed or provide the responses as synthesized speech to be audibly output.

The subquery set responder 140 may provide the subqueries sequentially as some subqueries may be dependent on other subqueries. For example, the subquery set responder 140 may first provide the subquery "Did Real Madrid win their last match" to an operation that provides answers and then provide the subquery "who do they play next" to the operation that provides answers. In the example, the operation may determine that "who" refers to "Real Madrid" in the prior query.

In some implementations, the subquery set responder 140 may provide the responses to the subqueries individually. For example, the subquery set responder 140 may provide a first response "It's 4:34 in Turks and Caicos" and then provide the second response "It's 1:34 PM in Mountain View, Calif." after the user provides the query "What time is it in Turks and Caicos and what time is it now." The responses may be provided as separate messages that are simultaneously displayed, in separate audio messages that are output one after another, or in some other manner. In some implementations, the subquery set responder 140 may also indicate how the query was parsed into subqueries. For example, the subquery set responder 140 may output audio of "For the query, what time is it in Turks and Caicos, it's 4:34 in Turks and Caicos" and "For the query, what time is it now, it's 1:34 PM in Mountain View, Calif." In another example, the subquery set responder 140 may cause to be displayed the text of "For the query, what time is it in Turks and Caicos, it's 4:34 in Turks and Caicos. For the query, what time is it now, it's 1:34 PM in Mountain View, Calif."

In some implementations, the subquery set selector 130 may obtain a quality score for the original query and determine whether to select the original query or the subquery set selector 130 based at least on the quality scores. For example, an original query may be "What time is it in Turks and Caicos" and a quality score for the original query may be 97% and a quality score for a set of subqueries including "What time is it in Turks" and "Caicos" may be 35%. In the example, the subquery set selector 130 may determine to select the original query over the set of subqueries as the quality score for the original query reflects a greater likelihood that a user will be satisfied by an operation executed using the original query than operations executed using the subqueries.

The subquery set generator 110, the subquery set scorer 120, the subquery set selector 130, and the subquery set responder 140 may be implemented on one or more computing systems. The subquery set generator 110 may receive a query from a device used by a user, e.g., a mobile computing device, a speech-enabled device, a laptop, a desktop computer, and the subquery set responder 140 may provide the responses to the device used by the user. For example, the subquery set generator 110, the subquery set scorer 120, the subquery set selector 130, and the subquery set responder 140 may be implemented on a server that is in communication with a mobile computing device of a user over a network.

In some implementations, the system 100 may generate sets of subqueries that include more than two subqueries. For example, the system 100 may take a query that has four "and" and generate four different sets of subqueries that each include three subqueries based on separating the query on all but one of the "and" in the query, the all but one "and" being a different "and" in the query for each set.

Additionally or alternatively, the system 100 may generate subqueries from a query that compares multiple items. For example, the system 100 may obtain a query of "Who is older, Barack Obama or Michelle Obama," generate a set of subqueries of "Barack Obama age" and "Michelle Obama age," and then provide respective responses of fifty six and fifty three for the subqueries. The subquery set generator 110 may generate subqueries from a query that compares items based on determining that a query includes a comparative term and references to two or more items. For example, the subquery set generator 110 may determine that a query includes the comparative term "older" and also includes the terms "Barack Obama" and "Michelle Obama."

In response to determining that a query includes a comparative term and references to two or more items, the subquery set generator 110 may map the comparative to an attribute. For example, the subquery set generator 110 may map the comparative term "older" to an attribute of "age." In another example, the subquery set generator 110 may map the comparative term "taller" to an attribute of "height." The subquery set generator 110 may then generate subqueries that each include the attribute and a corresponding item in the query, and provide the set of subqueries to the subquery set scorer 120 and the subquery set selector 130 for the system 100 to determine whether to provide respective responses to the subqueries or a response to the original query, as discussed above. For example, the subquery set selector 130 may select to provide respective responses to the subqueries of "Barack Obama age" and "Michelle Obama age" instead of a single response to the query "Who is older, Barack Obama or Michelle Obama." In another example, the subquery set selector 120 may select to provide responsive responses to the subqueries of "Burj Khalifa height" and "Empire State Building height" instead of a single response to the query "Which building is taller, Burj Khalifa or Empire State Building."

Additionally or alternatively, in response to determining that a query includes a comparative term and references to two or more items, the subquery set generator 110 may map the comparative term to a base form term. For example, the subquery set generator 110 may map a comparative term "older" to a base form term of "old" or map a comparative term of "taller" to a base form term of "tall." The subquery set generator 110 may then generate subqueries that each include the base form term and a corresponding item in the query, and provide the set of subqueries to the subquery set scorer 120 and the subquery set selector 130 for the system to determine whether to provide respective responses to the subqueries or a response to the original query, as discussed above. For example, the subquery set selector 130 may select to provide respective responses to the subqueries of "How old is Barack Obama" and "How old is Michelle Obama" instead of a single response to the query, "Who is older, Barack Obama or Michelle Obama." In another example, the subquery set selector 120 may select to provide responsive responses to the subqueries of "How tall is Burj Khalifa" and "How tall is Empire State Building" instead of a single response to the query "Which building is taller, Burj Khalifa or Empire State Building."

FIG. 2 is a block diagram of an example subquery set generator 202. The example subquery set generator 202 may be the subquery set generator 101 shown in FIG. 1. The subquery set generator 202 includes an n-gram replacer 210, a list identifier 220, and a query expander 230.

The n-gram replacer 210 of the subquery set generator 202 may receive a query and determine whether to replace any n-grams in the query with other n-grams. For example, the n-gram replacer 210 may obtain the query "What is the weather in Swiss ski resorts" and replace the n-gram "Swiss ski resorts" with the n-gram "Zermatt, St. Moritz, Davos, and Engelberg." An n-gram may be a sequence of one or more words.

The n-gram replacer 210 may determine whether to replace a n-gram in the query based on determining whether the n-gram is a query that is frequently used or has a known answer. For example, the n-gram replacer 210 may determine that the n-gram "Swiss ski resorts" is frequently searched for and a result of "Zermatt, St. Moritz, Davos, and Engelberg" is given in response to those searches and, in response, replace the n-gram "Swiss ski resorts" with "Zermatt, St. Moritz, Davos, and Engelberg" to obtain the query "What is the weather in Zermatt, St. Moritz, Davos, and Engelberg."

The list identifier 220 may identify lists in a query. For example, the list identifier 220 may obtain the query "What is the weather in Zermatt, St. Moritz, Davos, and Engelberg," identify that "Zermatt, St. Moritz, Davos, and Engelberg" is a list of items and, in response, output "What is the weather in [BEGIN LIST] Zermatt, St. Moritz, Davos, and Engelberg [END LIST]" that indicates where a list begins and where the list ends in the query.

The list identifier 220 may identify a list by determining the presence of "and" and commas preceding an "and." For example, the list identifier 220 may determine that "Zermatt, St. Moritz, Davos, and Engelberg" includes an "and" that is preceded by three commas so is a list with four items. In another example, the list identifier 220 may determine that "Barack and Michelle Obama" includes "and" so is a list with two items.

Additionally or alternatively, the list identifier 220 may identify a list by determining the presence of multiple entities that are related to one another are also proximate to one another in the query. For example, the list identifier 220 may determine that "Zermatt," "St. Moritz," "Davos," and "Engelberg" are all Swiss ski resorts and that the terms appear next to one another in "Zermatt, St. Moritz, Davos, and Engelberg" so that is a list with four items.

The query expander 230 may obtain a query with an identified list and expand the query into a set of subqueries with a respective subquery for each item in the list. For example, the query expander 230 may obtain "What is the weather in [BEGIN LIST] Zermatt, St. Moritz, Davos, and Engelberg [END LIST]" and expand that into a set of subqueries including "What is the weather in Zermatt," "What is the weather in St. Moritz," "What is the weather in Davos," "What is the weather in Engelberg."

The query expander 230 may expand the query into the set of subqueries by taking a portion of a query that occurs before the list and then prepending that to each of the items in the list. For example, the query expander 230 may take "What is the weather in" and then prepend that to each of "Zermatt," "St. Moritz," "Davos," and "Engelberg" to generate the respective subqueries of the set.

Figure 3:
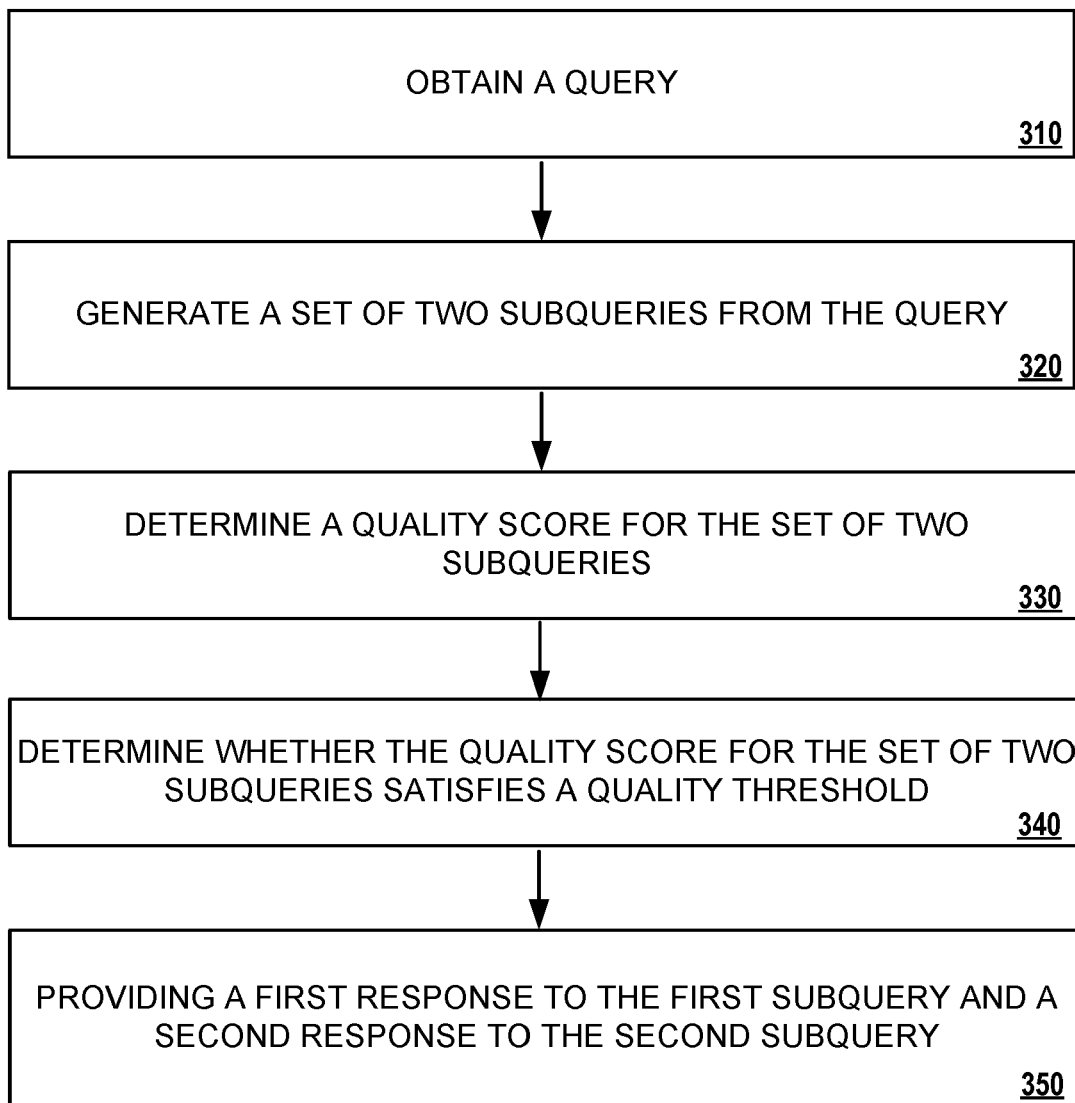
FIG. 3 is a flow diagram of an example process for generating subqueries from a query.

FIG. 3 is a flow diagram of an example process 300 for generating subqueries from a query. Process 300 can be implemented using system 100 described above. For example, the process 300 may be performed by the subquery set generator 110, the subquery set scorer 120, the subquery set selector 130, and the subquery set responder 140.

The process 300 includes obtaining a query (310). For example, the subquery set generator 110 may obtain the query "Turn on the lights and turn on some music."

The process 300 includes generating a set of subqueries from the query (320). For example, the subquery set generator 110 may obtain the query "Turn on the lights and turn on some music" and generate a set of subqueries "turn on the lights" and "turn on some music."

The process 300 includes determining a quality score for the set of two subqueries (330). For example, the subquery set scorer 120 may generate a quality score of 98% for the set of subqueries including "turn on the lights" and "turn on some music."

The process 300 includes determining whether the quality score for the set of two subqueries satisfies a quality threshold (340). For example, the subquery set selector 130 may determine that the quality score of 98% for the set of subqueries including "turn on the lights" and "turn on some music" satisfies a quality threshold of 80%. In another example, the subquery set selector 130 may determine that a quality score of 40% for a set of subqueries does not satisfy a quality threshold of 70%.

The process 300 includes providing a first response to the first subquery and a second response to the second subquery (350). For example, the subquery set responder 140 may provide the first subquery to a voice action operation and receive a first response of "lights turned on," provide a second subquery to a voice action operation and receive a second response of "music turned on," and provide the first response of "lights turned on" and the second response of "music turned on" for output to a user. In some implementations, the process 300 may provide the first response and the second response in response to determining that the quality score for the set of two subqueries satisfies a quality threshold. For example, if the quality score for a set of subqueries does not satisfy a quality threshold, then the subquery set responder 140 may not provide responses for the subqueries and may instead provide a response to the original query.

Figure 4:
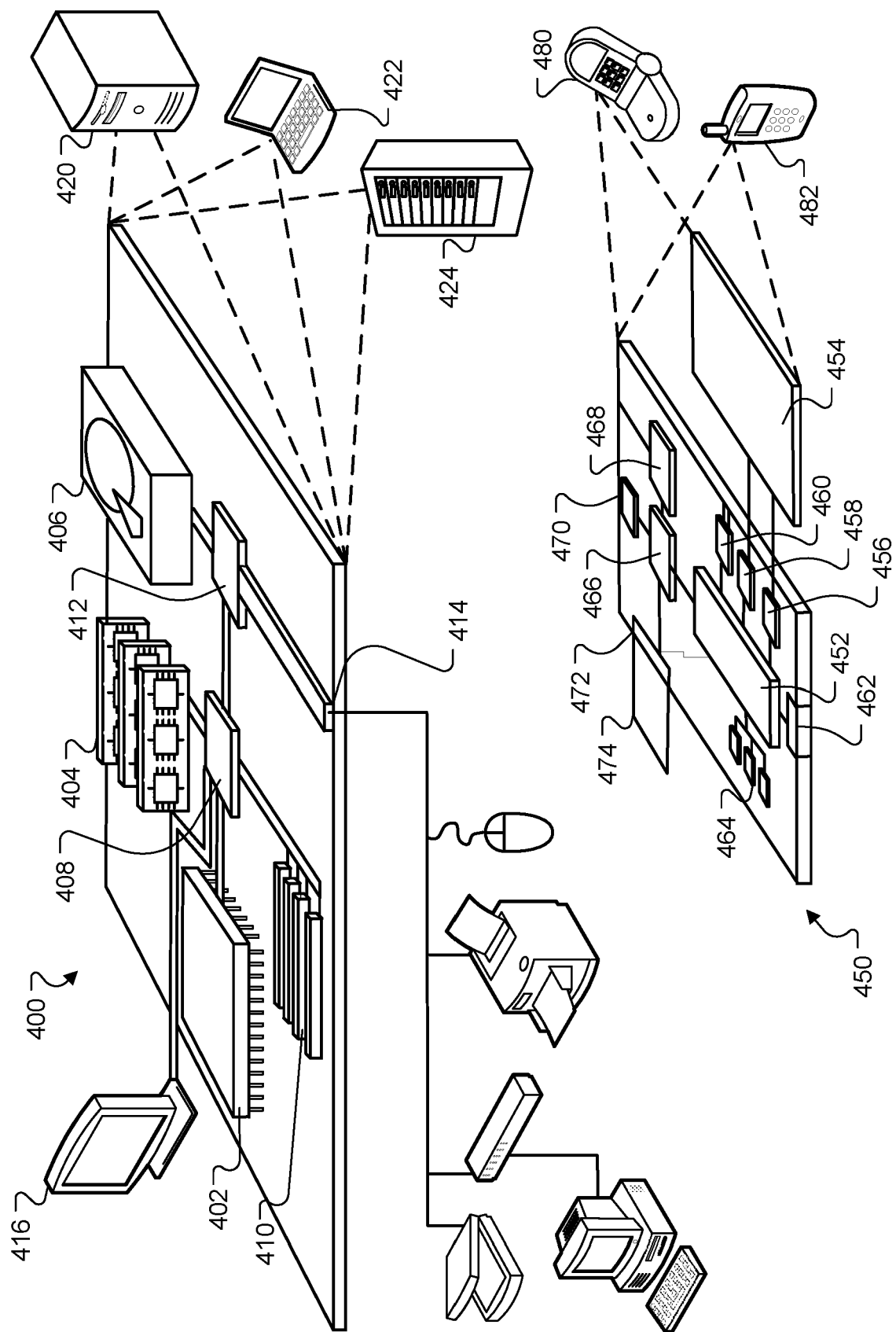
FIG. 4 is a block diagram of a computing system that can be used in connection with computer-implemented methods described in this specification.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used herein, the terms "machine-readable medium" "computer-readable medium" refers to any computer program product, apparatus and/or device, e.g., magnetic discs, optical disks, memory, Programmable Logic devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed.

For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the scope of the invention. For example, various forms of the flows shown above may be used, with steps re-ordered, added, or removed. Also, although several applications of the systems and methods have been described, it should be recognized that numerous other applications are contemplated. Accordingly, other embodiments are within the scope of the following claims.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, the method comprising:
   obtaining a query;
   generating a set of two subqueries from the query, where the set includes a first subquery and a second subquery;
   determining a quality score for the set of two subqueries;
   determining whether the quality score for the set of two subqueries satisfies a quality threshold; and
   in response to determining that the quality score for the set of two subqueries satisfies the quality threshold:
      executing a first voice action operation that is based on the first subquery, and
      executing a second voice action operation that is based on the second subquery.

2. The method of claim 1, wherein executing the first voice action operation causes the first voice action operation to be performed at one or more first devices and wherein executing the second voice action operation causes the second voice action operation to be performed at one or more second devices.

3. The method of claim 2, wherein the one or more first devices comprise one or more lights and wherein the first voice action operation includes turning on the one or more lights.

4. The method of claim 3, wherein the one or more second devices comprise one or more user devices having at least a corresponding speaker and wherein the second voice action operation includes playing music.

5. The method of claim 1, wherein the determining the quality score for the set of two subqueries comprises:
   determining a frequency that the first subquery appears in a log of prior queries from multiple users; and
   determining the quality score for the set of two subqueries based at least on the frequency that the first subquery appears in the log of prior queries from multiple users.

6. The method of claim 1, wherein the determining the quality score for the set of two subqueries comprises:
   determining that the first subquery corresponds to the first voice action operation; and
   determining the quality score for the set of two subqueries based at least on determining that the first subquery corresponds to the first voice action operation.

7. The method of claim 1, wherein the determining whether the quality score for the set of two subqueries satisfies a quality threshold comprises:
   determining whether the quality score for the set of two subqueries satisfies a predetermined threshold that reflects that a user is likely to be satisfied by respective operations being executed using each of the two subqueries.

8. The method of claim 1, further comprising:
generating a second set of two subqueries from the query;
determining a second quality score for the second set of two subqueries; and
determining that the first quality score reflects that respective operations being executed using the two subqueries of the first set of two subqueries is more likely to satisfy a user than respective operations being executed using the two subqueries of the second set of two subqueries.

9. The method of claim 1, wherein the generating the set of two subqueries from the query comprises:
identifying a position of one or more particular characters in the query;
generating the first query from a first portion of the query before the position of the one or more particular characters in the query; and
generating the second query from a second portion of the query after the position of the one or more particular characters in the query.

10. The method of claim 9, wherein the one or more particular characters comprise the word "and".

11. The method of claim 1, wherein the generating the set of two subqueries from the query comprises:
identifying a list of items in the query;
generating the first query from the portion of the query up to and including a first item of the list; and
generating the second query from the portion of the query before the first item of the list and including a second item of the list.

12. The method of claim 1, wherein the generating the set of two subqueries from the query comprises:
determining that a phrase in the query can be used as a third subquery that results in a list of items; and
replacing the phrase in the query with the list of items.

13. The method of claim 1, wherein the generating the set of two subqueries from the query comprises generating a set of three subqueries.

14. A system comprising:
a data processing apparatus; and
a non-transitory computer readable storage medium in data communication with the data processing apparatus and storing instructions executable by the data processing apparatus and upon such execution cause the data processing apparatus to perform operations comprising:
obtaining a query;
generating a set of two subqueries from the query, where the set includes a first subquery and a second subquery;
determining a quality score for the set of two subqueries;
determining whether the quality score for the set of two subqueries satisfies a quality threshold; and
in response to determining that the quality score for the set of two subqueries satisfies the quality threshold:
executing a first voice action operation that is based on the first subquery, and
executing a second voice action operation that is based on the second subquery.

15. The system of claim 14, wherein the determining the quality score for the set of two subqueries comprises:
determining a frequency that the first subquery appears in a log of prior queries from multiple users; and
determining the quality score for the set of two subqueries based at least on the frequency that the first subquery appears in the log of prior queries from multiple users.

16. The system of claim 14, wherein executing the first voice action operation causes the first voice action operation to be performed at one or more first devices and wherein executing the second voice action operation causes the second voice action operation to be performed at one or more second devices.

17. The system of claim 14, wherein the determining the quality score for the set of two subqueries comprises:
determining that the first subquery corresponds to the first voice action operation; and
determining the quality score for the set of two subqueries based at least on determining that the first subquery corresponds to the first voice action operation.

18. A non-transitory computer readable storage medium storing instructions executable by a data processing apparatus and upon such execution cause the data processing apparatus to perform operations comprising:
obtaining a query;
generating a set of two subqueries from the query, where the set includes a first subquery and a second subquery;
determining a quality score for the set of two subqueries;
determining whether the quality score for the set of two subqueries satisfies a quality threshold; and
in response to determining that the quality score for the set of two subqueries satisfies the quality threshold:
executing a first voice action operation that is based on the first subquery, and
executing a second voice action operation that is based on the second subquery.

* * * * *